United States Patent
Gonda et al.

[11] Patent Number: 5,150,167
[45] Date of Patent: Sep. 22, 1992

[54] IMAGE FORMING APPARATUS

[75] Inventors: Takashi Gonda, Aichi; Hirofumi Hasegawa, Hadano; Motohiro Yamada, Okazaki; Takayuki Ariyama, Toyokawa, all of Japan

[73] Assignee: Minolta Camera Kabushiki Kaisha, Osaka, Japan

[21] Appl. No.: 755,832

[22] Filed: Sep. 6, 1991

[30] Foreign Application Priority Data

Sep. 10, 1990 [JP] Japan ................ 2-240457

[51] Int. Cl.⁵ .............................. G03G 21/00
[52] U.S. Cl. ..................... 355/313; 355/200; 355/206; 355/208; 355/311; 355/314; 355/319; 355/321; 271/186; 271/225; 271/256
[58] Field of Search ............. 355/313, 314, 200, 208, 355/206, 308, 309, 316, 311, 318, 319, 326, 26, 24, 321, 203, 204; 271/225, 256, 258, 287, 288, 289–291, 186

[56] References Cited

U.S. PATENT DOCUMENTS

| | | | |
|---|---|---|---|
| 4,167,322 | 9/1979 | Yano et al. | 355/204 X |
| 4,591,884 | 5/1986 | Miyamoto et al. | 355/319 X |
| 4,707,713 | 11/1987 | Ayata et al. | 346/140 R |
| 4,745,490 | 5/1988 | Shimizu et al. | 355/24 X |
| 4,797,706 | 1/1989 | Sugishima et al. | 355/200 X |
| 4,972,236 | 11/1990 | Hasegawa | 355/319 |
| 4,998,195 | 3/1991 | Ito et al. | 355/200 X |
| 5,014,184 | 5/1991 | Ito et al. | 355/200 X |
| 5,038,273 | 8/1991 | Ito et al. | 355/204 X |

FOREIGN PATENT DOCUMENTS

| | | | |
|---|---|---|---|
| 0121063 | 7/1984 | Japan | 355/206 |
| 0121064 | 7/1984 | Japan | 355/206 |
| 0121066 | 7/1984 | Japan | 355/206 |
| 0046573 | 3/1985 | Japan | 355/313 |

Primary Examiner—A. T. Grimley
Assistant Examiner—Matthew S. Smith
Attorney, Agent, or Firm—Willian Brinks Olds Hofer Gilson & Lione

[57] ABSTRACT

An image forming apparatus having a plurality of image forming units and a sheet transporting unit for transporting sheets discharged from an arbitrary one of the image forming units to a discharge portion of its own or to that of other image forming unit. When one of the image forming units is incapable of continuous operation during the execution of an operation thereof, another image forming unit is operated in place thereof which feeds recording sheets of the same size as those of the former image forming unit and forms images with toner of the same color as that of the former image forming unit, and the image bearing sheets discharged from the latter image forming unit are discharged onto the same discharge portion as that of the former image forming unit.

11 Claims, 8 Drawing Sheets

FIG. 2(a)
position 1

FIG. 2(b)
position 2

FIG. 3

FIG. 3(a)
position 1

FIG. 3(b)
position 2

FIG. 4

FIG. 4(a)
position 1

FIG. 4(b)
position 2

IMAGE FORMING APPARATUS

BACKGROUND OF THE INVENTION

1. Field of the Invention

The present invention relates to an image forming apparatus for printers and the like.

2. Description of the Related Art

In recent years, demand has increased for printers using laser light beams, LEDs and the like as light sources and having multifunctionality insofar as being capable of duplex printing function, composite printing function, color printing function, sorter function and the like. On the other hand, demand has also increased for inexpensive, compact single-function apparatus which today can be produced having a height of only about 20 cm.

The applicant has previously proposed in U.S. Pat. No. 4,972,236 an image forming apparatus having a plurality of image forming units stacked vertically, wherein the paper supplying units and the paper discharging units of the upper and the lower image forming units are mutually connected via a paper transporting unit having a switching means for selectively changing the paper transport path.

The aforesaid image forming apparatus is capable of providing a duplex printing function, a composite printing function and a color printing function by supplying paper in various modes to a plurality of image forming units via a paper transporting unit, and is further capable of image formation via each of the respective image forming units.

U.S. Pat. No. 4,707,713 further discloses an image forming apparatus wherein a plurality of image forming units are controlled by a single controller device, such that when any of the image forming unit enters a non-functional state, said non-functional state is detected and image formation continues with the other image forming unit in accordance with identical recording conditions.

The previously mentioned image forming apparatus disclosed in U.S. Pat. No. 4,972,236 has a disadvantage inasmuch as the image forming process must unavoidably be discontinued whenever the image forming process is interrupted due to a toner empty or paper empty or like condition arises during a continuous execution of image formation of multiple sheets by an optionally selected image forming unit.

On the other hand, the image forming apparatus disclosed in U.S. Pat. No. 4,707,713 is capable of executing continuous image formation using another image forming unit when the previously described conditions occur. Nevertheless, disadvantages arise because in order to detect the discharge of the image bearing sheets to the discharge portion of the respective image forming units, it is necessary to collect the concerned sheets from the discharge portion of each image forming unit, thereby complicating the labor of the operator.

SUMMARY OF THE INVENTION

A main object of the present invention is to provide an image forming unit capable of accomplishing continuous image formation using another image forming unit when an image forming process executed by one image forming unit must be unavoidably discontinued during a continuous execution of image formation of multiple sheets by an optionally selected image forming unit, and which is capable of discharging the image bearing sheet to the same discharge portion regardless of which image forming unit is used.

These and other objects of the present invention are achieved by providing an image forming unit comprising:

a first image forming portion having a first image forming means for forming images on a recording sheet, a first sheet discharge portion for discharging the recording sheet bearing a recorded image, and a first transport path for transporting the recording sheet from the first image forming means to the first sheet discharge portion, a second image forming portion having a second image forming means for forming images on a recording sheet, a second sheet discharge portion for discharging the recording sheet bearing a recorded image, and a second transport path for transporting the recording sheet from the second image forming means to the second sheet discharge portion and which is connectable to the aforesaid first transport path so as to be capable of selectively transporting a recording sheet bearing an image formed by either the first or the second image forming means to the aforesaid first or second sheet discharge portions, a detecting means for detecting at least when the first image forming portion is no longer capable of continuously executing an image forming operation, and a control means for continuing an image forming operation via the second image forming portion in place of the first image forming portion when the aforesaid detecting means detects that the first image forming portion is incapable of continuous operation during the execution of an on-going operation of said first image forming portion, and controlling the discharge of the recording sheets bearing images formed by the second image forming portion so as to discharge said sheets to said first sheet discharge portion.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

A first embodiment of the present invention is described hereinafter with reference to FIGS. 1 through 7.

Figure 1:
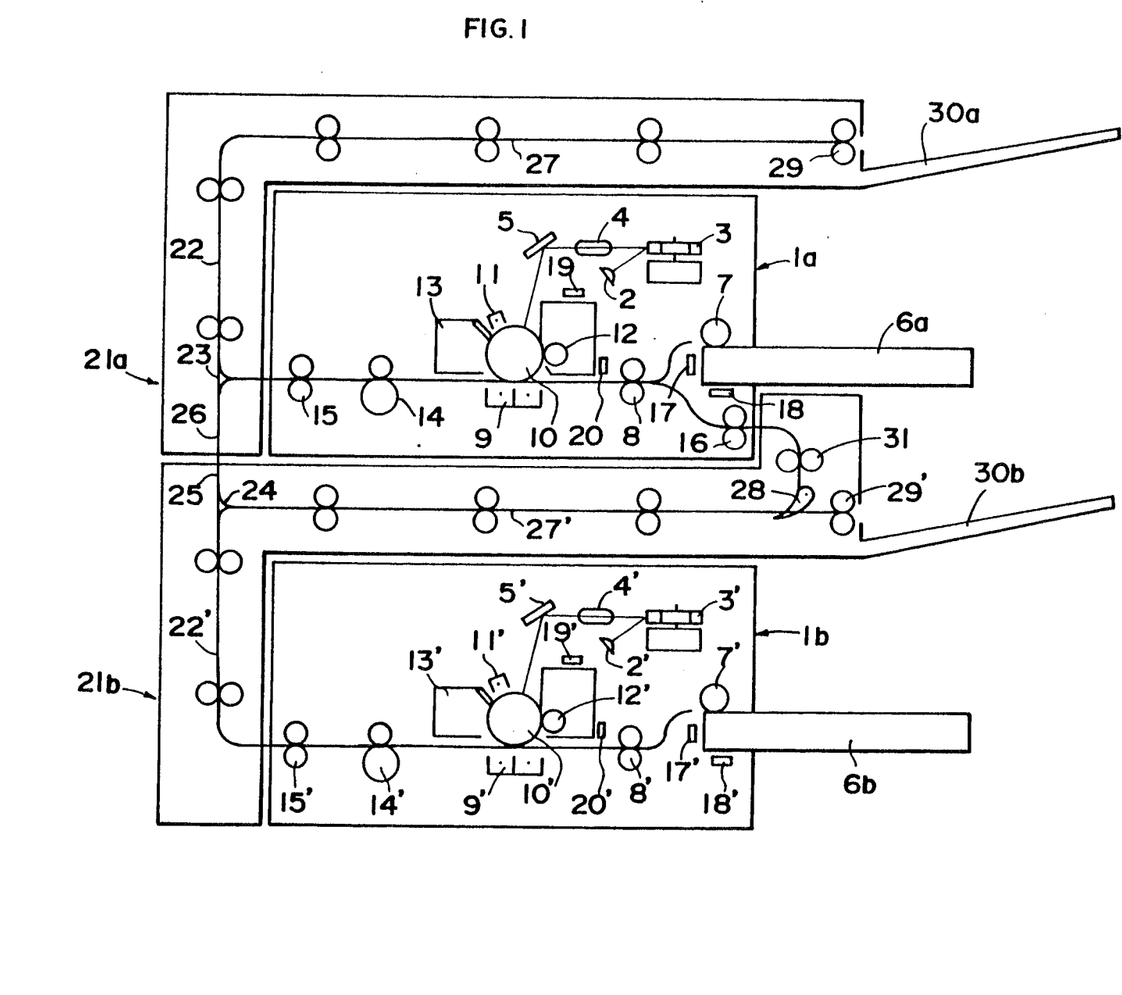
FIG. 1 briefly shows the general construction of a first embodiment of the image forming apparatus of the present invention.

FIG. 1 shows two-stage image forming units comprising single-function compact printers 1a and 1b stacked vertically one upon another. The discharge opening of the bottom image forming unit 1b and the sheet supply opening of the upper image forming unit 1a are connected via lower transport unit 21b interposed between the image forming units 1a and 1b. An upper transport unit 21a is provided on top of the upper image forming unit 1a.

In each of the image forming units 1a and 1b, semiconductor lasers 2 and 2' emit beams modulated by the respective image control portions not shown in the drawing. The modulated laser beams scan in the main scan direction via polygonal mirrors 3, 3', pass through the correcting lenses 4, 4' and reflecting mirrors 5, 5' so as to form images on the photosensitive drums 10 and 10', respectively. The photosensitive drums 10, 10' are electrically charged by the chargers 11, 11' so that the laser beams form electrostatic latent images thereon, said latent images then are developed by the developing units 12, 12' and transferred onto recording sheets by the transfer chargers 9, 9', and residual toners are removed from the photosensitive drums by the cleaners 13, 13'.

The recording sheets are fed via the feed rollers 7, 7' from the paper cassettes 6a, 6b installed in the image forming units 1a, 1b, respectively. The fed sheets are transported to the transfer portions via registration rollers 8, 8' with a timing that coincides with the image formed on the surface of the photosensitive drums 10, 10'. The sheets bearing the images transferred at the transfer portions are then fixed by the fixing units 14, 14', and discharged by the discharge rollers 15, 15' from the discharge openings. The upper image forming unit 1a is provided a recirculating roller 16 which receives the sheet discharged from the transport unit 21b at the sheet supply opening below the paper cassette 6a, and feeds said sheet to the registration roller 8. Of course, the aforesaid recirculating roller may be alternatively provided in the lower image forming unit 1b.

The paper size sensors 17, 17' are provided at the front of the cassettes 6a, 6b, whereas the paper empty sensors 18, 18' are provided at the bottom of said cassettes, respectively. The toner empty sensors 19, 19' are provided at the top of the developing devices 12, 12', and the toner color sensors 20, 20' are provided at the back thereof. The paper size sensors 17, 17' discriminate the size of the paper accommodated in the cassettes 6a and 6b indirectly and at the same time, discriminate whether or not the cassettes 6a and 6b are installed via microswitch combinations corresponding to notch/protrusions provided on the front face of said cassettes 6a and 6b. Magnetically operated reed switches, photosensors or the like may be used as the aforesaid sensors. The toner color sensors 20, 20' have identical constructions and detect toner color indirectly.

The transport units 21a, 21b are provided vertical transport paths 22, 22' for transporting the sheets discharged from the discharge rollers 15, 15' in an upward direction, and horizontal transport paths 27, 27'. The terminal ends of the horizontal transport paths 27, 27' are provided discharge rollers 29, 29' for discharging sheets onto the discharge trays 30a, 30b of the upper and lower units, respectively.

A dividing member 24 is provided at the top end of the vertical transport path 22' of the lower transport path 21b. The vertical transport path 22' is divided by the aforesaid dividing member 24 into a bypass path 25 for direct upward sheet advancement and a horizontal transport path 27'. Sheets advanced directly through the bypass path 25 are discharged from the bottom transport unit 21b and fed into the bypass path 26 of the top transport unit 21a. A dividing member 23 is provided at the bottom end of the vertical transport path 22 of the top transport unit 21a, so that sheets discharged from the upper image forming unit 1a and sheets supplied from the bypass path 26 can be selectively fed to the vertical transport path 22. Furthermore, a dividing member 28 is provided at the front position of the discharge roller 29' of horizontal transport path 27' in the bottom transport unit 21b, and is constructed so as to be switchable to either discharge sheets to the discharge tray 30b via the discharge roller 29' or feed sheets to the recirculating roller 16 of the upper image forming unit 1a via the feed roller 31. Although the dividing member 23 and the bypass path 26 have not been provided in the bottom transport unit 21b, and the dividing member 24, the bypass path 25, dividing member 28 and roller 31 have not been provided in the top transport unit 21a, either of the deficient portions may be supplemented.

Figures 2, 2A, 2B:
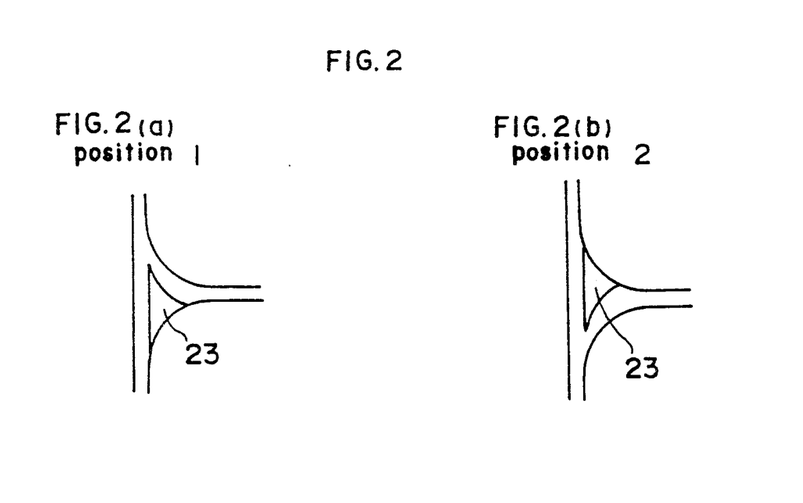
FIGS. 2a, 2b, 3a, 3b, 4a and 4b are illustrations showing the switched positions of each switching member of the image forming apparatus of FIG. 1.
Figures 3, 3A, 3B:
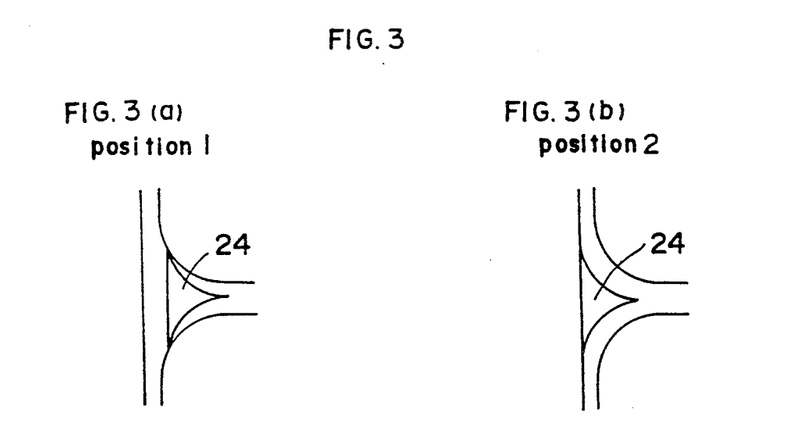
Figures 4, 4A, 4B:
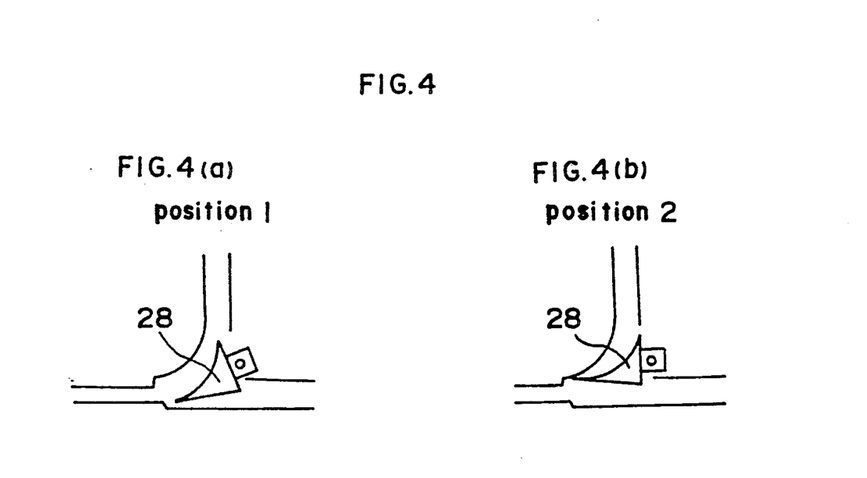

FIGS. 2a and 2b show the switched positions of the dividing member 23, FIGS. 3a and 3b show the switched positions of the dividing member 24, and FIGS. 4a and 4b show the switched positions of the dividing member 28. Each of the aforesaid dividing members are electrically switchable between a first position and a second position.

Figure 5:
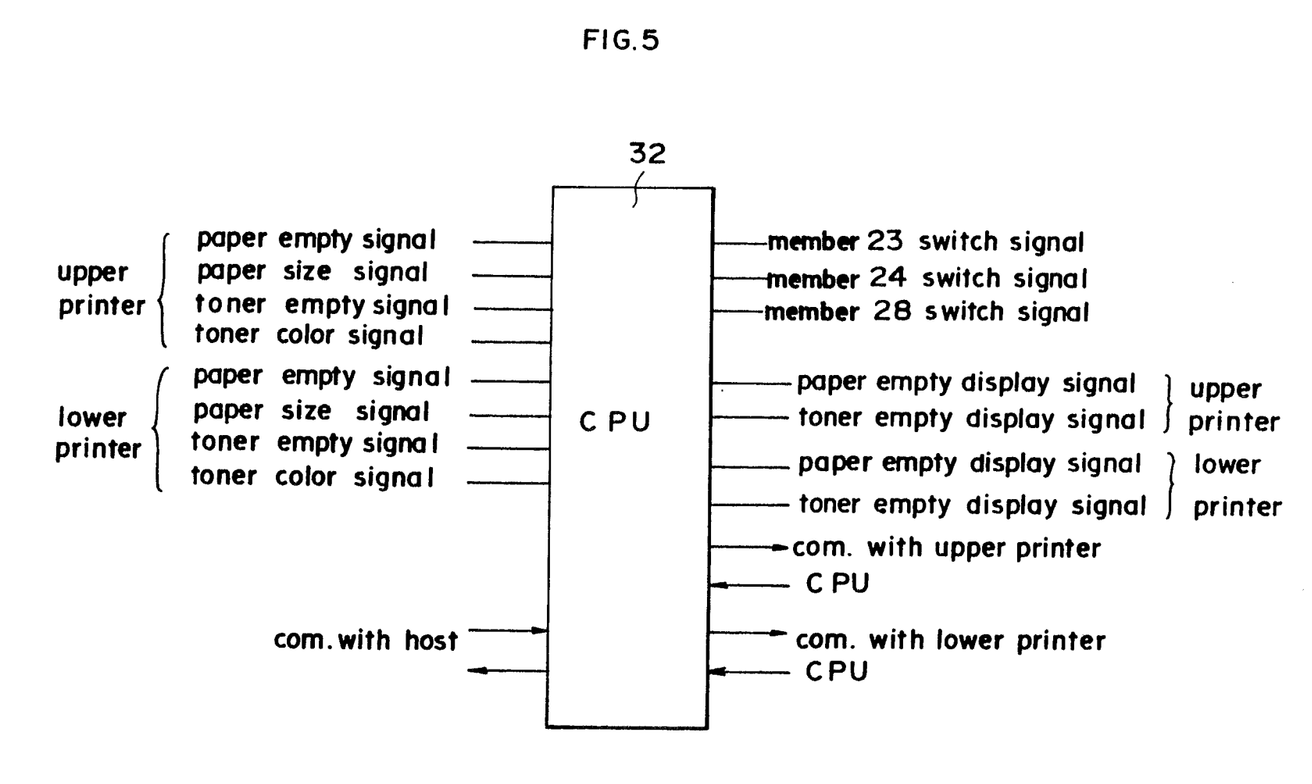
FIG. 5 is a block diagram of the control portion of the image forming apparatus of FIG. 1.

The previously described upper and lower image forming units 1a, 1b and the transport units 21a, 21b are operationally controlled by a central processing unit (CPU) 32 comprising a microcomputer, as shown in FIG. 5. Signals are transmitted to the CPU 32 from the paper size sensors 17, 17', the paper empty sensors 18, 18', and the toner color sensors 20, 20'.

Figure 6:
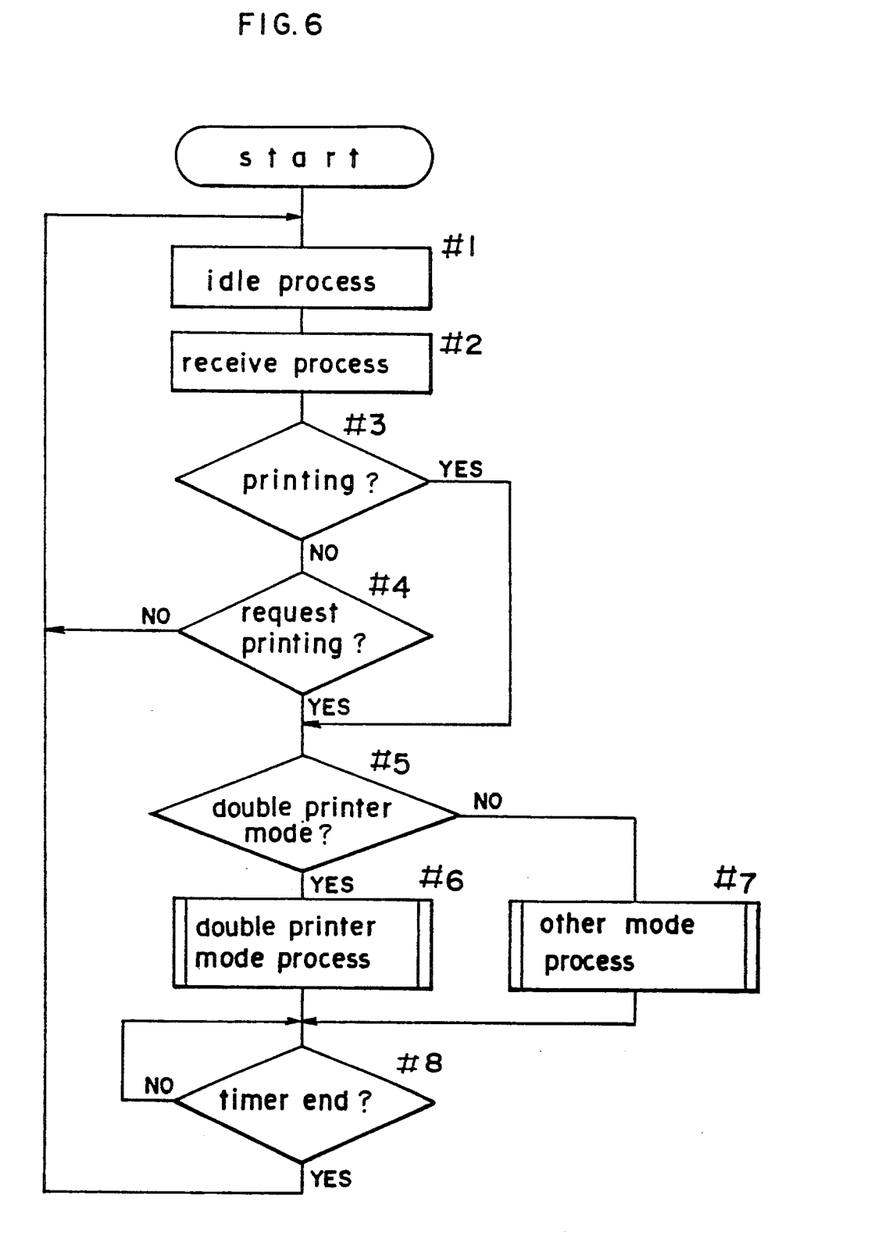
FIG. 6 is a main flow chart showing the control operation of the image forming apparatus of FIG. 1.
Figure 7:
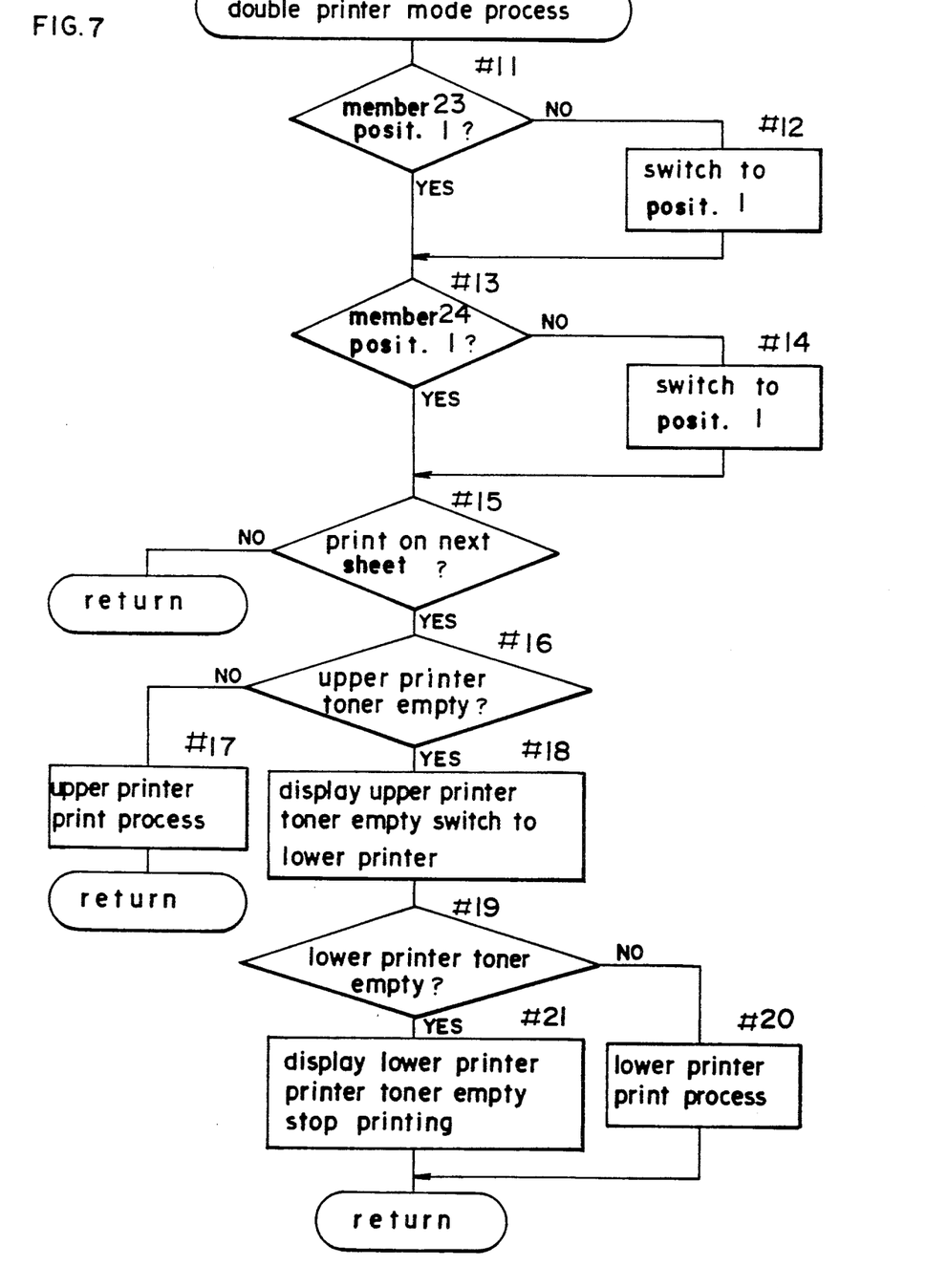
FIG. 7 is a flow chart showing the double printer mode process of FIG. 6

The image forming operations of the upper and lower image forming units 1a and 1b (hereinafter referred to as "printers") are described with reference to the flow charts in FIGS. 6 and 7.

When the power unit is turned on, the idle process of step #1 is executed. The idle process is a process for printer standby, and includes processes for temperature control of the fixing devices 14 and 14', display control for the various displays, switch input and the like. Then, the data reception process is executed in step #2, and a check is made in step #3 to determine whether or not the printers are currently operating. When the printers are not currently operating, a check is made for the existence of a print request in step #4. If there is not a print request, the apparatus remains on standby and steps #1 through 4 are repeated. When a print request has been issued and a print operation is currently ongoing, a check is made in step #5 to determine whether or not the double printer mode has been selected. In order to select the double printer mode, both the two-stage printers 1a and 1b must accommodate the same size paper and the same color toner, said conditions being detected via signals input from the paper size sensors 17, 17' and the toner color sensors 20, 20'. If a mode other than the double printer mode has been selected, the printing process is executed in step #7 in accordance with the selected printer mode. Other printer modes include the single printer modes for operating singly the upper and lower printers 1a and 1b, the multiprinter mode for individually printing with different upper and lower printers, the composite mode for combining images by recirculating a sheet printed by the lower printer 1b to the upper printer 1a via switching the dividing member 28 to the first position, and like modes. If the double printer mode is found to have been selected in step #5, the printing process is executed in step #6 in accordance with the double printer mode. When the upper printer 1a is unable to continue an on-going printing process due to a paper empty, toner empty or like condition, the double printer mode continues the remaining printing operation via the lower printer 1b. Then, a check is made in step #8 to determine whether or not the timer has completed, whereupon the routine returns to step #1 and the previously described processes are repeated.

The routine of the double printer mode process is described hereinafter with reference to FIG. 7. It has been assumed in the following description that a toner empty condition has occurred during an on-going printing process.

First, in step #11, the dividing member 23 is checked to determine whether or not it is set at the first position. If not set at the first position, the dividing member 23 is switched to the first position in step #12 to allow a sheet discharged from the upper printer 1a to be discharged to the upper discharge tray 30a. Next, in step #13, the dividing member 24 is checked to determine whether or not it is set at the first position. If not set at the first position, the dividing member 24 is switched to the first position in step #14 to allow a sheet discharged from the lower printer 1b to also be discharged to the upper discharge tray 30a. Next, in step #15, a check is made to determine whether or not a subsequent sheet is to be printed. This check is made because, even with a toner empty condition, the printer switching operation is unnecessary if no further sheet requires printing. When it is determined that a subsequent sheet does require printing in step #15, the routine continues to step #16 where the upper printer 1a is checked for the toner empty condition. If the toner is not empty, the routine continues to step #17 whereupon the upper printer 1a executes the printing process. If a toner empty condition is determined for the upper printer 1a in step #16, the routine continues to step #18 where the toner empty condition is displayed, and operation is switched to the lower printer 1b. Then, in step #19, the toner empty condition of the lower printer 1b is checked. If a toner empty condition does not exist, the routine continues to step #20 and the lower printer 1b executes the printing process. When a toner empty condition is determined in step #19, the routine continues to step #21 where the toner empty condition is displayed and the printing operation is terminated.

That is, in this example, the printing operation of the upper printer 1a has priority. When a toner empty condition is detected for the upper printer 1a, the toner empty condition is displayed and the printing operation is switched to the lower printer 1b. If the lower printer 1b also develops a toner empty condition, said condition is displayed and the printing operation is terminated.

Although in the present embodiment the printing operation is completely terminated when the upper and lower printers 1a and 1b develop toner empty conditions, the printing operation may be continuous insofar as the aforesaid conditions do not arise. Furthermore, since sheets printed by either the upper or lower printers 1a and 1b are discharged to the upper discharge tray 30a, the inconvenience of handling the discharged sheets after completion of printing a set number of sheets is avoided.

Figure 8A:
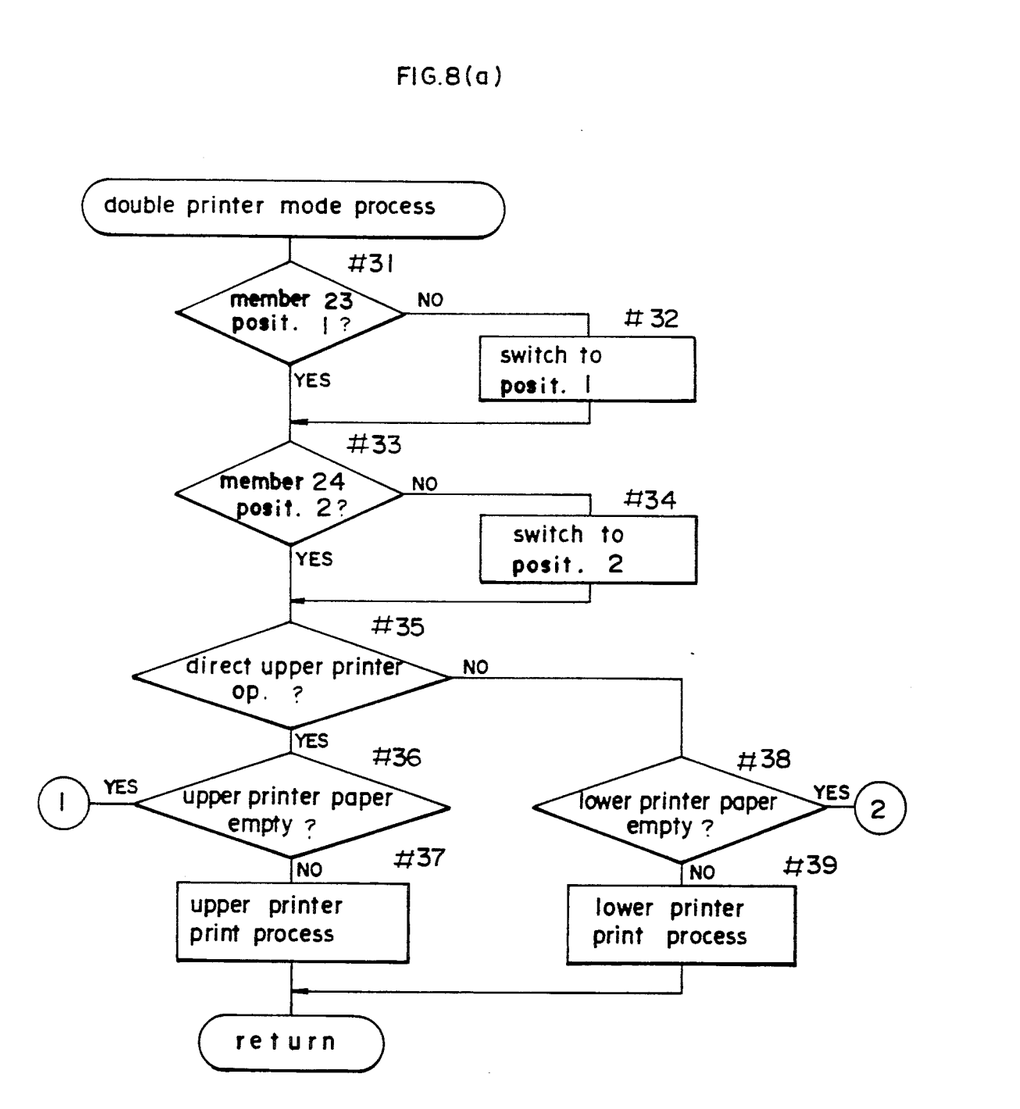
FIG. 8 is a flow chart showing the double printer mode process of another embodiment of the present invention.
Figure 8B:
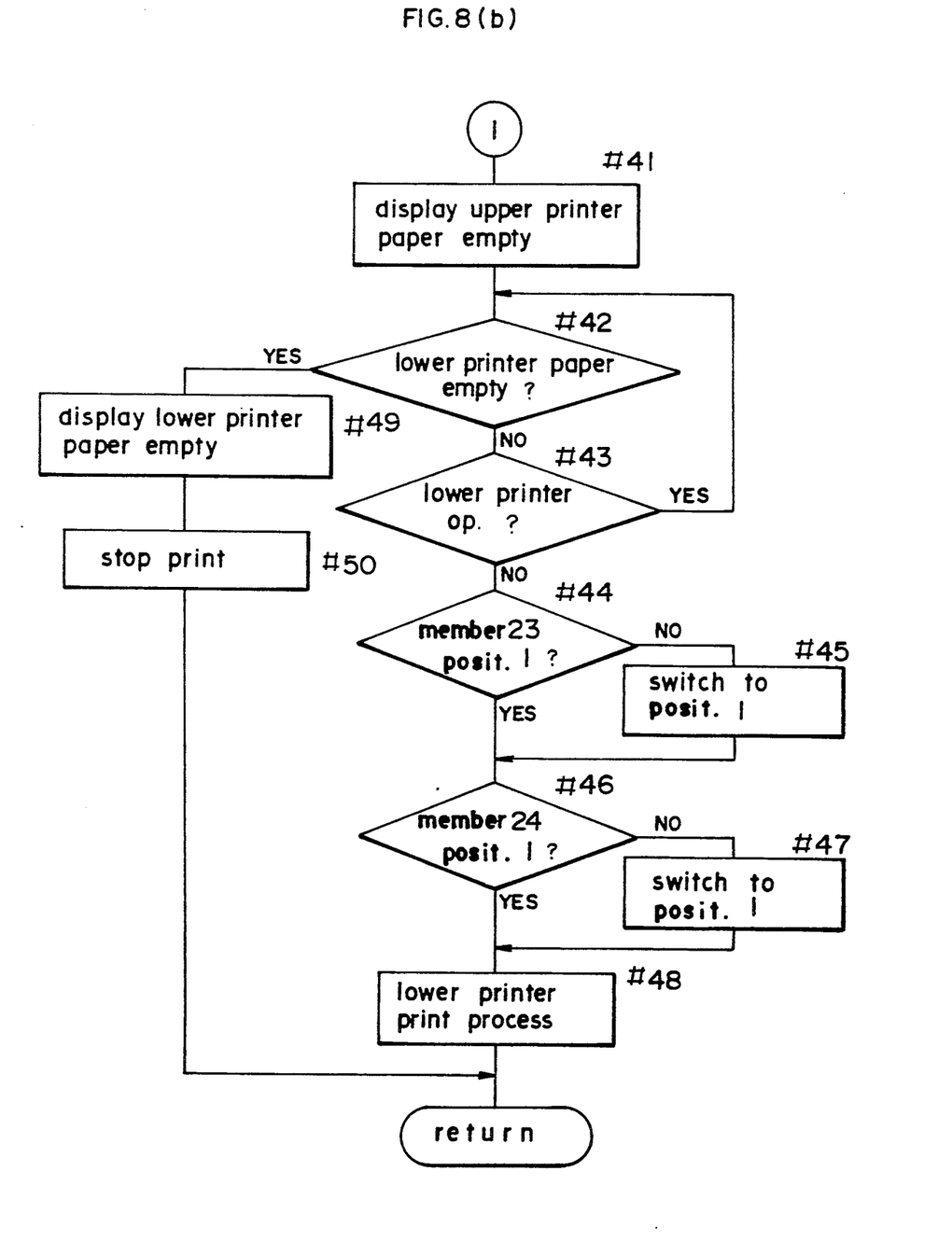

The routine of the double printer mode process when the printers are switched due to a paper empty condition is described hereinafter with reference to FIGS. 8a through 8c. In this example, printing can be started using either the upper or lower printer 1a or 1b in accordance with the input data.

First, the positioning of the dividing members 23 and 24 are verified (steps #31, 32), and if not set at the predetermined position said members are switched to the other position (steps #32, 34). That is, the dividing member 23 is set at the first position and the dividing member 24 is set at the second position. Then, a check is made to determine whether or not the input data are for use by the upper printer 1a (step #35), and printers are operated in accordance with the data directed to the respective printers. Next, a check is made to determine the paper empty conditions of the upper and lower printers 1a, 1b (steps #36, 38), and if a paper empty condition is not detected the printing process is executed for the respective printers 1a and 1b (steps #37, 39), whereupon the routine returns.

When the result of the checks performed in steps #36 and 38 indicate the paper empty condition, the routine moves to steps #41 through 50 (FIG. 8b) in the former case, and steps #51 through 60 (FIG. 8c) in the latter. Since the controls performed in these routines are essentially identical, only the steps #41 through 50 are described herein. After the upper printer 1a paper empty condition is displayed (step #41), the lower printer 1b is checked for a paper empty condition (step #42). If no paper empty condition is found in step #42, the lower printer 1b is then checked for an on-going operation (step #43). If an on-going operation is found in step #43, the routine returns to step #42 and the completion of the operation is awaited. If an on-going operation is not found in step #43, the positions of the dividing members 23 and 24 are checked (steps #44 and 46), and if said dividing members are not in the first position they are switched to the first position (steps #45 and 47). Thus, even sheets printed by the lower printer 1b can be discharged to the discharge tray 30a of the upper printer 1a. Next, the printing process is executed for the lower printer 1b (step #48), and the routine returns. On the other hand, when the paper empty condition is found in step #42, the paper empty condition is displayed in step #49, the on-going printing process is terminated (step #50) and the routine returns.

Figure 8C:
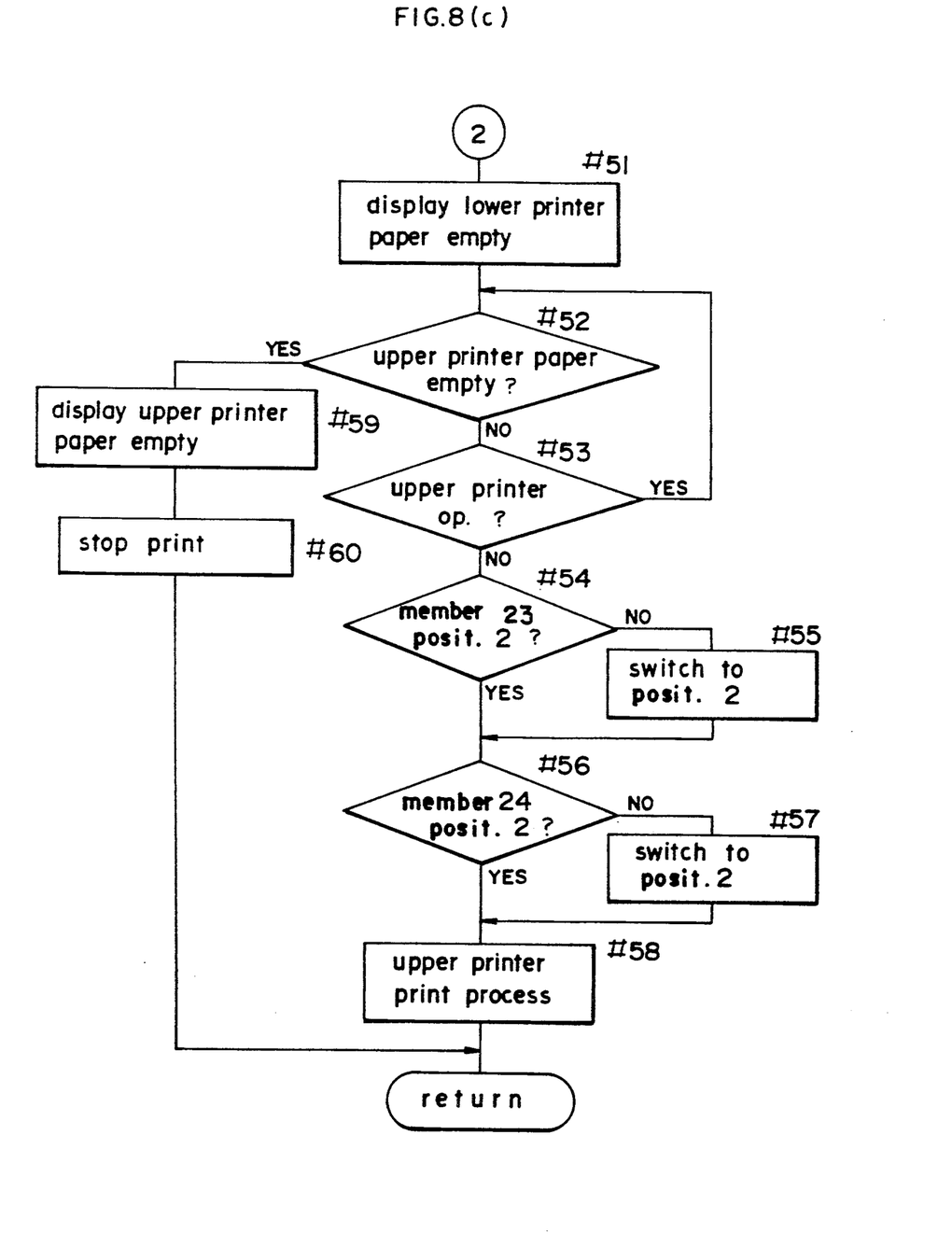

When switching from the lower printer 1b to the upper printer 1a, steps #51 through 60 are executed as shown in FIG. 8c wherein the dividing members 23 and 24 are switched to the second position, printing is executed by the upper printer 1a and the printed sheets are discharged to the discharge tray 30b of the lower printer 1b.

Therefore, when any of the printers 1a and 1b enter the paper empty condition, not only can the other printer 1a or 1b be used alternatively, but the sheets printed by the alternative printer may also be discharged to the discharge tray of the original printer so as to be discharged in a collated condition.

The present invention is not limited only to the previously described embodiments. For example, the aforesaid embodiments were described in terms of the occurrence of a paper empty condition and a toner empty condition, similar operational control may be exerted in the case of the service life of the photosensitive drum, filled capacity of the waste toner box, abnormalities of the optical system, failure of the fixing lamp, failure of the eraser lamp and the like. While the invention has been described in terms of two image forming units in the preceding examples, three or more image forming units may alternatively be used. While laser printers were used as the image forming units in the examples, thermal transfer printers, inkjet printers and the like may alternatively be used. Moreover, the image data need not necessarily be provided to the printers from a host computer, insofar as said image data may be provided from an image reader apparatus for image reproduction.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. An image forming apparatus comprising:
   a plurality of image forming means each of which is capable of forming images and includes a sheet feeding portion for feeding recording sheets therefrom, and a sheet discharge portion for discharging the recording sheet bearing a recorded image,
   a sheet transporting unit for transporting sheets discharged from an arbitrary one of said image forming means to the discharge portion of its own or to that of other image forming means,
   a control means for controlling, when one of said image forming means is incapable of continuous operation during an execution of its operation, to operate another image forming means in place thereof, and controlling to discharge the image bearing sheets onto the same discharge portion to which sheets are discharged previously.

2. The image forming apparatus as claimed in claim 1 wherein each said image forming means includes a sheet size detection means for detecting the size of the sheets to be fed from the sheet feeding portion and further includes a color detection means for detecting the color of toner for forming images.

3. The image forming apparatus as claimed in claim 2 further comprising mode set means for setting a first mode to, when one of said image forming means is incapable of continuous operation during an execution of its operation, operate another image forming means in place thereof, or setting a second mode for executing the other operation than that of said first mode.

4. The image forming apparatus as claimed in claim 3 wherein said first mode is being selectable when the sheet sizes detected by each said sheet size detection means are the same and at the same time, the toner colors detected by each said color detection means are the same.

5. An image forming apparatus comprising:
   a first image forming portion having a first image forming means for forming images on recording sheets, a first sheet discharge portion for discharging the recording sheet bearing a recorded image, and a first transport path for transporting the recording sheet from the first image forming means to the first sheet discharge portion,
   a second image forming portion having a second image forming means for forming images on a recording sheet, a second sheet discharge portion for discharging the recording sheet bearing a recorded image, and a second transport path for transporting the recording sheet from the second image forming means to the second sheet discharge portion and which is connectable to said first transport path so as to be capable of selectively transporting a recording sheet bearing an image formed by either the first or the second image forming means to said first or second sheet discharge portions,
   detecting means for detecting at least when the first image forming portion is no longer capable of continuously executing an image forming operation, and
   control means for continuing an image forming operation via the second image forming portion in place of the first image forming portion when said detecting means detects that the first image forming portion is incapable of continuous operation during the execution of an operation thereof, and controlling to discharge the sheets bearing images formed by the second image forming portion to said first sheet discharge portion.

6. The image forming apparatus as claimed in claim 5 wherein each said image forming means includes a sheet size detection means for detecting the size of the sheets to be fed from the sheet feeding portion and further includes a color detection means for detecting the color of toner for forming images.

7. The image forming apparatus as claimed in claim 6 further comprising mode setting means for setting a first mode for, when said first image forming means is incapable of continuous operation during an execution of its operation, operating said second image forming means in place of said first image forming means, or setting a second mode for executing the other operations than that of said first mode.

8. The image forming apparatus as claimed in claim 7 wherein said first mode is being selectable when the sheet sizes detected by each said sheet size detection means are the same and at the same time, the toner colors detected by each said color detection means are the same.

9. An image forming apparatus comprising:
   a plurality of image forming means each of which is capable of forming images and includes a sheet feeding portion for feeding recording sheets therefrom, a sheet discharge portion for discharging the recording sheet bearing a recorded image, a size detecting means for detecting a size of recording sheets fed from the sheet feeding portion, and a color detecting means for detecting a color of developer for forming images,
   a sheet transporting unit for transporting sheets discharged from an arbitrary one of said image forming means to the discharge portion of its own or to that of other image forming means,
   a detecting means for detecting at least when one of the image forming means is no longer capable of continuously executing an image forming operation, and
   a control means for controlling, when said detecting means detects that one of the image forming means is incapable of continuous operation during the execution of an operation thereof, to operate another image forming means in place thereof which feeds recording sheets of the same size as those of said one of the image forming means and forming images with the toner of the same color as that of said one of the image forming means, said control means discharging the image bearing sheets onto the same discharge portion to which sheets are discharged previously.

10. The image forming apparatus as claimed in claim 9 wherein said control means controls, when one of the image forming means runs out of recording sheets, to operate another image forming means.

11. The image forming apparatus as claimed in claim 9 wherein said control means controls, when one of the image forming means runs out of toner, to operate another image forming means.

* * * * *